United States Patent [15] 3,644,883

Borman et al. [45] Feb. 22, 1972

[54] AUTOMATIC VEHICLE MONITORING, IDENTIFICATION, LOCATION, ALARM AND VOICE COMMUNICATIONS SYSTEM

[72] Inventors: William M. Borman, Niles; Donald L. Walker, Addison, both of Ill.

[73] Assignee: Motorola, Inc., Franklin Park, Ill.

[22] Filed: Dec. 29, 1969

[21] Appl. No.: 888,519

[52] U.S. Cl. ....................................340/23, 325/16

[51] Int. Cl. ....................................G08g 1/12

[58] Field of Search...............340/23, 24; 180/98; 246/187 B

[56] References Cited

UNITED STATES PATENTS

| | | | |
|---|---|---|---|
| 3,181,150 | 4/1965 | Ruppersberg et al. | 340/22 X |
| 3,257,640 | 6/1966 | Beaven | 340/22 |
| 3,419,865 | 12/1968 | Chisholm | 340/24 |

*Primary Examiner*—William C. Cooper
*Attorney*—Mueller & Aichele

[57] ABSTRACT

In a computer-controlled bus-monitoring system, each of the buses in the system is provided with a two-way radio for communication with the control center on either a voice channel or a data channel. In addition, each bus includes a second receiver for receiving signals from signpost transmitters located along the route, with the signpost information being stored in a temporary storage unit in the bus. The computer continually controls interrogation of all of the buses in the system on a data channel, with the buses automatically replying with the stored signpost location plus the time elapsed since that signpost location was stored in the bus. Deviations from schedule are displayed on a control console at the control center. The bus may be alerted to reply on a voice channel by a special code sent over the data channel with selective calling of the particular bus being provided, and a provision also is made for alerting the control center of an emergency on the bus by automatic data transmission from the bus over the voice channel.

19 Claims, 7 Drawing Figures

INVENTORS
WILLIAM M. BORMAN
DONALD L. WALKER
BY Mueller, Aichele & Rauner
ATTYS.

INVENTORS
WILLIAM M. BORMAN
DONALD L. WALKER
BY Mueller, Aichele & Rauner
ATTYS.

AUTOMATIC VEHICLE MONITORING, IDENTIFICATION, LOCATION, ALARM AND VOICE COMMUNICATIONS SYSTEM

BACKGROUND OF THE INVENTION

Most of the passengers carried by metropolitan transit companies are carried on conventional motor buses operating over established routes at preestablished schedules. In order most efficiently to utilize the bus equipment and to provide the most satisfactory service to the riders of the buses, it is necessary to maintain the operating schedules of the buses as close as possible to the schedules which have been established for each of the buses in the system. In the past, most bus systems have relied primarily upon the individual bus operators to maintain their schedules and to avoid disastrous traffic situations and the like. As the streets become more congested and more people use bus transportation to meet their transit requirements, it becomes mandatory to develop a transit control system which provides accurate control of the schedules of all of the buses in the system.

At the present time, many transit companies place supervisors on street corners for controlling the operations of the buses on routes passing the street corners to which the supervisors are assigned. Communications procedures and devices have been developed in order to assist these supervisors in communicating with dispatchers in order to control and maintain the scheduled operations of the buses in the system. Such a technique, however, is relatively inefficient and requires a large number of supervisors in order to provide the dispatchers with an accurate picture of the operations on each of the different runs or routes of the buses in the system.

In order accurately to control the scheduling of buses in a system, it is necessary for the dispatchers to know when two buses are running too close to one another, due to either behind-schedule or ahead of schedule buses, thereby providing unbalanced and inefficient utilization of the equipment and disrupting schedules. It also is desirable to know, as soon as possible, when a bus develops mechanical trouble; so that a decision can be made to keep the bus in service, send it to a garage, or stop operation and to provide supplementary equipment to substitute for the disabled bus if necessary. In many situations, the dispatching of emergency equipment to the bus in a short time will enable the placement of the bus back in service without significantly disrupting the service on the route of which the bus is a part.

Since street obstructions either of a semipermanent nature or of a temporary nature, such as accidents, frequently occur on metropolitan transit system routes, it is desirable to be able to alert the buses on the route which is obstructed by such an obstruction, so that immediate action can be taken to direct the buses to alternate street routes if necessary. Finally, in most metropolitan transit operations, increasing problems with safety on the buses are occuring. Robberies, vandalism, and disorderly conduct not only jeopardize the operator but can deter riders from using the transit system. As a consequence, it is desirable to provide the bus operator with a means for summoning help on an emergency basis in an unobtrusive manner.

SUMMARY OF THE INVENTION

Accordingly, it is an object of this invention to provide an improved vehicle monitoring system.

It is an additional object of this invention to provide an improved vehicle monitoring system in which the location of vehicles following a preestablished route is provided automatically in response to interrogation of the vehicles from a control center.

It is a further object of this invention to provide signpost transmitters along the route traveled by a vehicle, with a receiver in the vehicle recording the signpost location transmitted by each signpost transmitter and also recording the elapsed time interval occurring since the storage of the signpost information in the vehicle, so that interrogation of the vehicle causes automatic transmission of the signpost and elapsed time information from the vehicle to a central control station.

It is a further object of this invention to provide an improved emergency alarm system for a vehicle operating on a preestablished route.

It is still another object of this invention to provide data and voice communication modes between a vehicle and a central control station, with automatic vehicle identification being transmitted from the vehicle for the voice mode of operation of the vehicle transmitter.

In accordance with a preferred embodiment of this invention, a vehicle monitoring system includes a central control station having transmitter and receiver portions for monitoring the positions of vehicles traveling over predetermined routes in the system. A vehicle in the system is interrogated with an interrogation code unique to that vehicle, causing the vehicle automatically to transmit position information and elapsed time information in response thereto. The position information is changed each time the vehicle passes a position indicating transmitter located along its route, with the information being stored in the vehicle in a storage circuit. Each time information is stored in the storage circuit, an elapsed time indicating means is reset and thereupon commences to store the time interval which has elapsed since the storage means least stored position information.

A further provision is made in each of the vehicles for enabling the transmission from the vehicle to the control station automatically on the data channel or over a voice channel, with a vehicle identification code being transmitted in conjunction with transmission from the vehicle over the voice channel. An alarm feature permits the operator of the vehicle to transmit digital location and vehicle identification information automatically over the voice channel upon actuation of an alarm switch, with receipt of the alarm information over the voice channel being recorded and displayed at the control center; so that the necessary action may be taken by the dispatchers at the control center as soon as possible.

The control center provides for an automatic sequential interrogation of all of the vehicles in the system to obtain automatically therefrom the position information and elapsed time information, with this information being compared by means of a computer-controlled system at the control center with the preestablished route information for each of the vehicles.

DETAILED DESCRIPTION

Figures 1, 3:
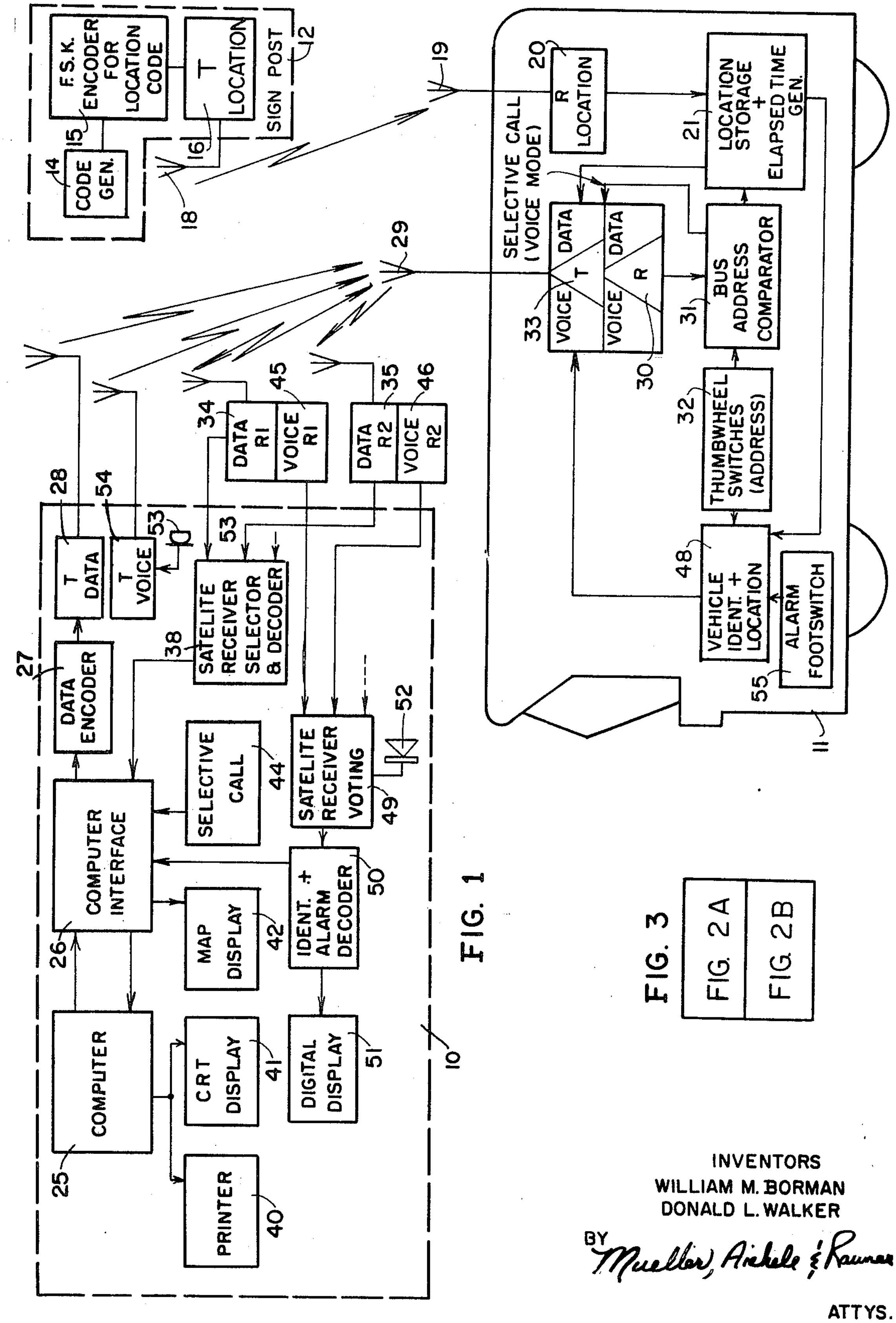
FIG. 1 is a block diagram of a system in accordance with a preferred embodiment of this invention.
FIG. 3 shows the manner of interconnecting FIGS. 2A and 2B.

In the drawings, the preferred embodiment of the invention is illustrated as a system for monitoring the operation of buses operating over preestablished routes according to preestablished schedules in a metropolitan transmit system. It should be noted, however, that this system also could be utilized for monitoring the operations of vehicles following random routes according to a random schedule.

In FIG. 1 there is shown a block diagram of a control station 10 indicated in dotted lines for monitoring the operations of buses such as the bus 11 over a number of preestablished routes located in a transit system. The system illustrated in FIG. 1 has three principle operating modes; location; voice, and alarm, which are generally described in conjunction with FIG. 1 in that order.

The bus locating mode is a data retrieval system in which information acquired by and stored within the bus 11 is periodically called for by the control station 10 and is sent to the control station 10 by the buses over a radio communication link. Located along each of the several routes traversed by the buses in the system are "signpost" transmitter units 12 located at spaced intervals, with a convenient spacing being generally of the order of several blocks depending upon the rate at which the buses normally traverse the particular section of the route located between successive signpost transmitters 12. The transmitter units 12 each include a digital location information generator 14 in the form of a ring counter or the like, which provides a unique digital code particularly identifying the location of the signpost with which the code generator is associated. This code generator 14 supplies the digital signpost identification code to an FSK encoder 15 which converts the binary digital codes into tones which then are utilized to modulate a location transmitter 16 in a manner which is identical to voice modulation. These modulated signals from the transmitter 16 then are continually transmitted from an antenna 18 at each of the signposts 12 located throughout the system.

The transmitter 16 is chosen to be a low power device which transmits only over a limited range. The short range of the transmitter 16 is chosen so that it is necessary for a bus 11 to be near the signpost in order to receive the information. For a practical system it has been determined that if the range of the signpost transmitter 16 is of the order of 200 feet, adequate operation of the system results. It is desirable to use a radio transmitter instead of an inductive loop system, since the utilization of an inductive loop requires the burying of a cable in the street thereby necessitating a relatively expensive installation. The signpost transmitter unit 12 may be mounted on a traffic light post and may receive power from the power supply to the traffic lights, so that installation of the signpost transmitter unit 12 is relatively simple.

The FSK tones transmitted by a signpost transmitter 16 are received on an antenna 19 by a signpost location receiver 20 is a bus 11 when the bus is within the range of the transmitter 16 for the particular signpost. Each time that the bus receives a new number from a signpost unit 12, this information is supplied by the signpost location receiver 20 to a location storage and elapsed time generator unit 21 located within the bus 11. The storage of new signpost information causes the elapsed time generator in the unit 21 to be reset to an initial time, with the time generator then providing a measurement of the time interval occurring subsequent to the storage of signpost location information in the unit 21. Thus, after passing a signpost unit 12, the bus 11 has stored an identification number corresponding to that signpost and further continues to record or measure the time which has elapsed since the bus passed the signpost location.

At the control station 10, a computer 25 is provided with all of the route and scheduling information of all of the different buses 11 in the system to be controlled by the control station 10, with this information being applied to a computer interface unit 26 in the form of a continual sequence of location interrogation addresses. These addresses include a unique identification address for each bus accompanied by a digitally encoded location interrogation sequence. This sequence provided by the computer interface circuit 26 is supplied through a data encoder 27 which modulates the output of a data transmitter 28, operating on a data interrogation frequency, to continually and sequentially interrogate the buses in the system in accordance with the interrogation program provided by the computer 25.

These interrogation signals are received by an antenna 29 in the buses 11 and are applied to a receiver unit 30 in each of the buses. The receiver unit is capable of receiving signals on either of two frequencies and normally is rendered sensitive to the frequency of the signals transmitted by the data transmitter 28. The data signals from the transmitter 28 are continually monitored in a bus address comparator 31 which is provided with a unique preset bus address from prewired and thumbwheel switches in an address unit 32 carried by the bus. Whenever the interrogation address transmitted by the transmitter 28 corresponds to the address set in the address unit 32 within the bus, the bus comparison circuit 31 provides an output interrogation signal to the location storage and elapsed time generator unit 21, which thereupon provides output signals to a transmitter unit 33 located in the bus. The transmitter 33 then automatically transmits the data signals corresponding to the location storage and the elapsed time on a data frequency to the control station 10.

These signals are received by a number of data receivers two of which 34 and 35 are shown. The receivers 34 and 35 may be at outlying locations scattered throughout the area covered or controlled by the control station 10; so that a satellite receiver selector and decoder 38, in the control station 10, selects one of the receivers 34 or 35 having the best signal and provides the decoded digital data transmitted by the bus through the computer interface unit 26 to the computer 25. The computer 25 then compares the information transmitted by the bus 11 with the preestablished schedule for that bus in the computer storage circuitry; and if the bus is on schedule or within preestablished limits of the schedule, no output is provided by the computer 25.

If the bus 11, however, is not on schedule or within the limits of the schedule, the computer 25 provides an output to a printer 40 which maintains a permanent record of all off-schedule operations and, in addition, provides the same information to a cathode ray tube display device 41; so that the dispatcher has immediate information with respect to the identity and location of the off-schedule bus 11. The schedule deviation may be either behind schedule or ahead of schedule; and if desired, this information also may be displayed on the display 41 and recorded by the printer 40. In addition, a map display 42 may be used to display by means of a display light or the like, the location of the off-schedule bus 11.

In the event that off-schedule information is presented by the computer on the display units 41 and 42, it is desirable for the dispatcher to be able to contact the operator of the off-schedule bus in order to advise him of what corrective action, if any, should be taken. This is accomplished through use of a selective call unit 44, through which the dispatcher at the control station 10 may selectively address the off-schedule bus 11. In addition, the unit 45 may be used to call a group of buses or all buses using different addresses. The selective call address is provided to the computer interface 26, which then provides the selective call along with a signal indicating that the bus is to operate in a voice mode in response to the call, and the interface circuit 26 places the selective calling interrogation between intervals in the automatic location interrogation sequence which is provided by the computer 25. The format of the location interrogation is such that periodic intervals are provided for the purpose of admitting selective call interrogations from the selective calling unit 44. The selective call interrogation is encoded by the data encoder 27 and applied to the data transmitter 28 in the same manner as the interrogation signal for the location interrogation obtained from the computer 25.

The selective call and other voice mode interrogation signals also are received at the buses 11 on the antenna 29 by the data receiver 30 and are supplied to the comparator circuit 31, which compares the bus address with the received address in the same manner as described previously. The selective call voice mode signal also is identified by circuitry (not shown in FIG. 1) to cause a voice mode output indication signal to be obtained from the comparator circuit 31. This indication signal is utilized to energize a warning light and buzzer on the bus operator's console. When the operator observes the light or hears the buzzer, he may place his radio "off hook" in a conventional manner, which in turn operates a switch to change the receiver frequency of the receiver 30 and the transmitter frequency of the transmitter 33 to frequencies corresponding to the voice channel of the system.

Communication from the bus over the antenna 29 then is on a voice frequency, which is received by a number of satellite voice frequency receivers, two of which 45 and 46 are shown, located at separated locations throughout the area controlled by the control station 10. The signals received by the voice frequency receivers are supplied to the control station 10 either over land lines or by suitable radio links and a satellite receiver voting section system selects the one of the voice satellite receivers 45, 46, etc., which provides the best signal in accordance with known techniques, and applies this signal to an identification and alarm decoder 50.

When transmission is initiated from the bus transmitter 33 operating in the voice mode, the vehicle identification or address is automatically transmitted by the bus, and this vehicle identification is detected and decoded by the decoder unit 50. The decoded digital information then is provided to a digital display 51, so that the dispatcher may observe visually that he has contacted the bus 11 to which the selective calling message was directed. Once this communications link is established, normal voice communication is obtained from the output of the satellite receiver voting circuit 49 and is reproduced by a suitable loudspeaker 52. Voice transmission to the bus 11 is accomplished through a conventional microphone 53 and voice transmitter 54, which transmits on a fourth frequency to the bus which is now in the voice mode and receives the voice information transmitted by the transmitter 54 and operates a loudspeaker in the bus from the receiver 30 in a conventional manner.

During the time that this voice communication is taking place between the bus 11 and the control station 10, the computer 25 continues to supply location interrogation signals by way of the data transmitter 28 to the other buses in the system, since only the bus 11 which is operating in its voice mode is unable to transmit location data to the control station 10, due to the fact that its transmitter 33 is operating in the voice frequency range. All of the other buses in the system continue to respond automatically in the data frequency range to the location interrogation signals obtained from the control station 10 by way of the data transmitter 28. As soon as voice communication between a bus 11 and the control station 10 is terminated, the bus operator places his radio on hook, which automatically causes the receiver 30 and the transmitter 33 to revert to their data frequencies, placing the bus 11 which had been in voice communication back into the data mode of operation, responsive to the data interrogation signals obtained from the data transmitter 28.

An additional provision is made in the bus 11 for enabling the operator of the bus to signify an alarm condition such as may occur when vandalism, robbery, or the like is taking place on the bus. To signal such an alarm condition, the bus operator depresses an alarm foot switch 55, which then causes the bus transmitter 33 to placed in the voice frequency mode of operation, even though the on hook condition of the bus radio is present. At the same time, the transmit light on the bus radio is disabled, so that the transmission takes place unobtrusively. Depression of the alarm foot switch then causes the transmission frequency on the voice channel from the transmitter 33 to be modulated with the complete vehicle identification and location code from the vehicle identification and location generator 48, which is supplied with inputs from the location storage and elapsed time generator circuit 21 and the bus address unit 32. This information is continually transmitted for a time period of approximately 2 minutes and is supplied from the output of the identification and alarm decoder 50 to the digital display 51, and, in addition, is supplied to the computer interface unit 26 and to the map display unit 42.

Since the length of the digital message transmitted by the bus for the alarm condition is longer than the digital vehicle identification code transmitted at the beginning of each normal voice transmission from the bus, a distinction is made by the alarm decoder 50 between such normal vehicle identification and the digital information indicating an alarm condition. Thus, the alarm decoder 50 for an identified alarm sequence of decoded digital information may be utilized to sound an audible alarm in addition to providing a digital output of the bus location and identification on the digital display 51. In addition, an alarm condition or light may be provided on the map display 42 from the output of the alarm decoder 50 and the output of the computer interface unit 26 which normally controls the map display.

With this precise identification of the bus and its location, it is possible for a dispatcher to summon assistance within seconds after the bus operator depresses the alarm foot switch 55. At the end of the preestablished 2-minute time period which causes the continuous transmission of the alarm information from the bus 11, the radio in the bus reverts to its normal operation. The time period of approximately 2 minutes is chosen to insure that the digital alarm message transmitted by the bus is properly received at the control station 10 without interference from voice messages on the voice channel. An important feature of the alarm system is that it is not completely dependent upon the computer 25, since all of the necessary basic information also is contained in the digital readout on the digital display unit 51. Thus, if the computer 25 is out of service, the alarm system still functions; although the map display unit 42 does not provide a map indication of the bus location.

Figure 2A:
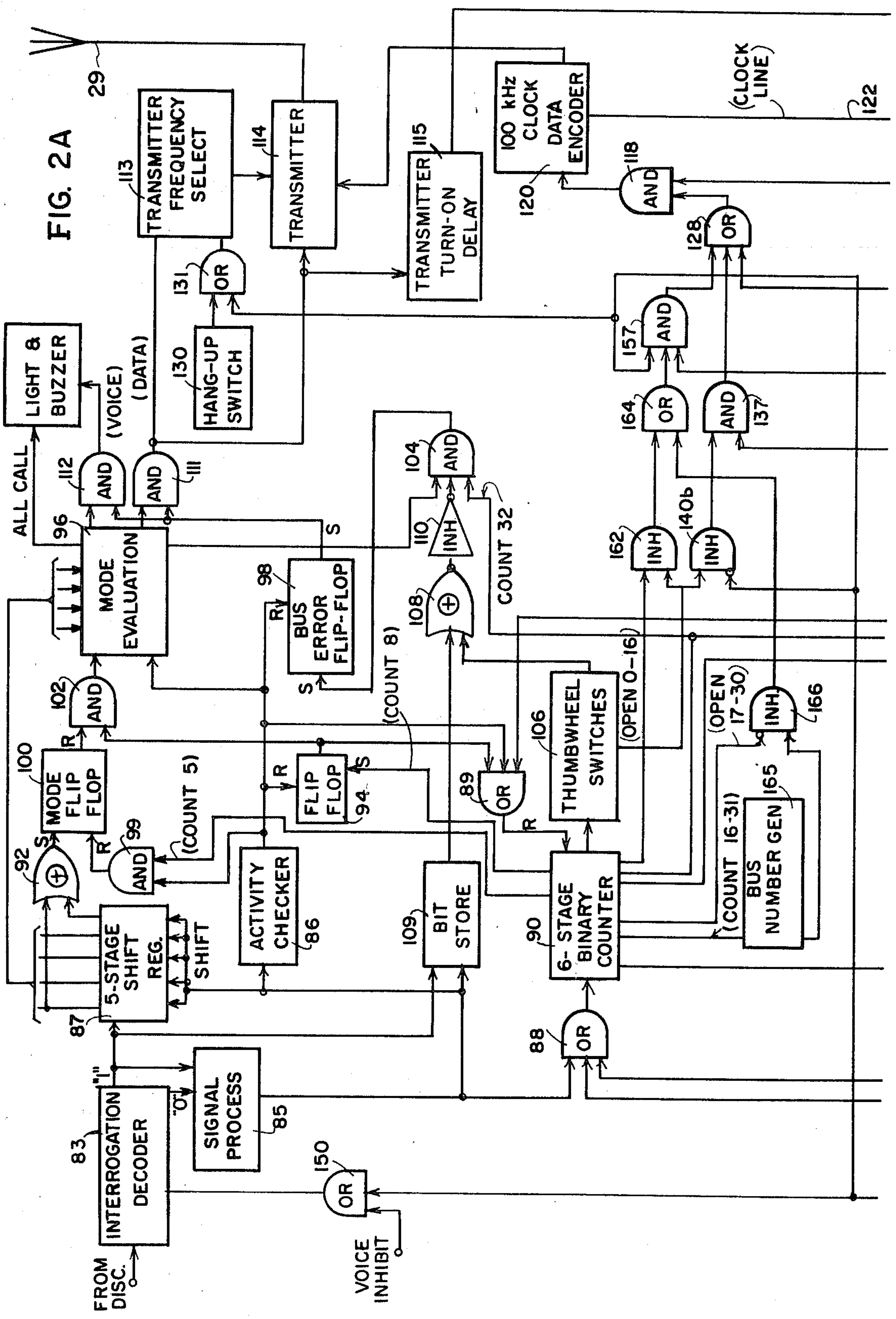
FIGS. 2A and 2B are a block diagram showing details of the system in the vehicle of FIG. 1.
Figure 2B:
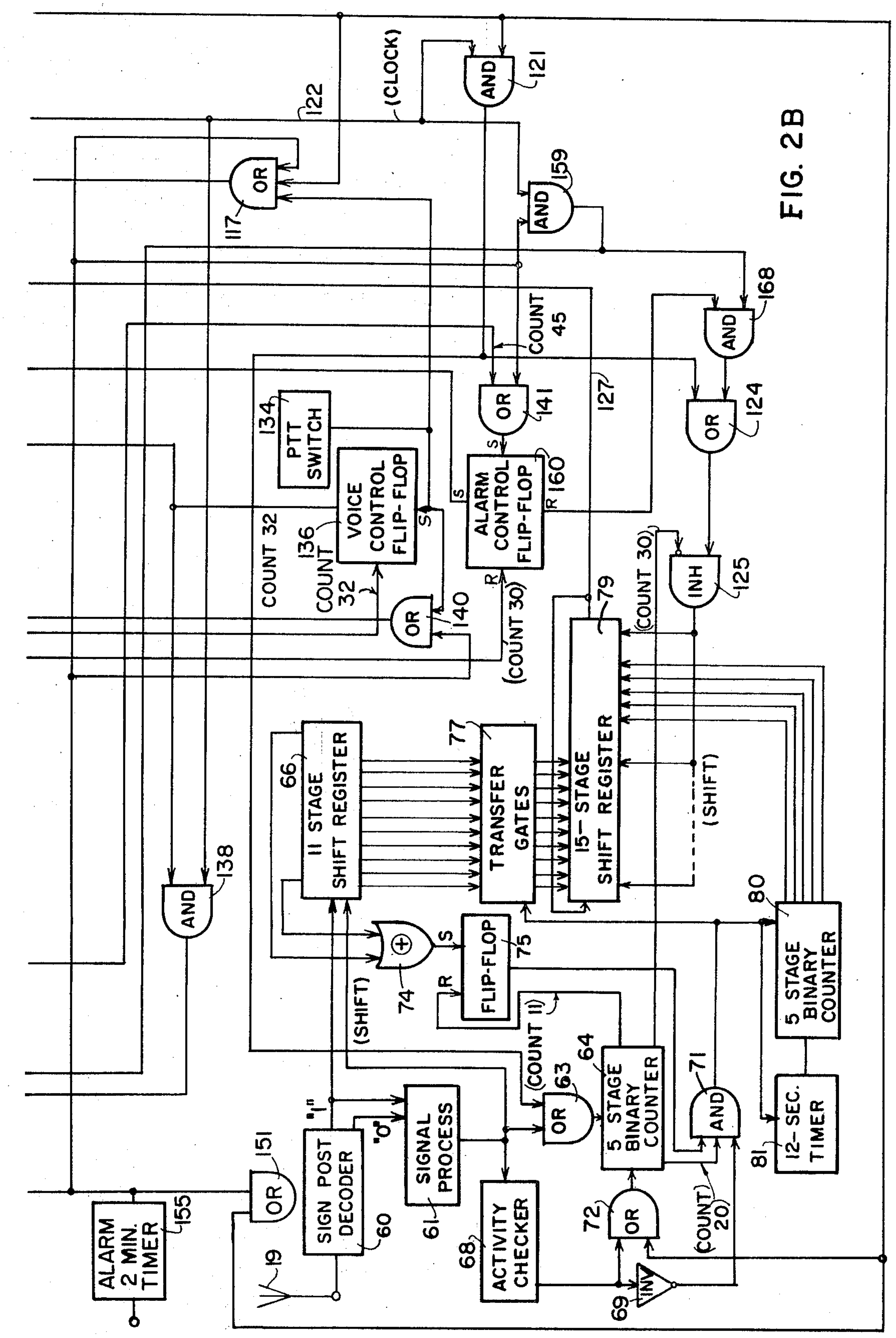

Referring now to FIG. 2, there is shown a detailed block diagram of the control logic for receiving, processing, and controlling the transmission of data in the bus 11. Whenever a bus enters the range of one of the signpost transmitter units 12, the location receiver 20 (FIG. 1) in the bus supplies the frequency-shift-encoded signals obtained from that signpost unit 12 to a signpost decoder unit 60, which decodes the frequency shift keyed signals into the binary data in the form of "1" and "0" data pulses.

Since either a binary "1" or a "0" occurs within each time interval of the received information from the signpost transmitter, the decoded binary information may be utilized to provide clock pulse signals to operate the processing circuitry for storing the signpost information. Thus, both of the binary outputs of the decoder circuit 60 are applied to a signal processing circuit 61 which provides clock pulses in synchronism with each received data bit decoded by the decoder circuit 60. These clock pulses then are applied through an OR gate 63 to a five stage binary counter 64 to step the counter once for each clock pulse.

The binary "1" output of the decoder circuit 60 is applied to the input stage of an 11-stage location store shift register 66, and shift pulses for the shift register 66 are obtained from the output of the signal processing circuit 61; so that the shift register 66 is stepped in synchronism with the stepping of the five stage binary counter 64.

The clock pulses from the output of the signal processing circuit 61 also are applied to an activity checking circuit 68 which may be of conventional type, employing an integrating circuit providing one signal level when the clock pulses occur at the expected rate and providing a lower signal level when no clock pulses are obtained from the output of the signal processing circuit 61. For the purposes of the present discussion, assume that the output of the activity checker goes high or more positive in the presence of clock pulses from the output of the signal processing circuit 61, and goes low a predetermined time interval after the cessation of such clock pulses. This output of the activity checker 68 is inverted by an inverter 69 to provide one of the inputs to an AND-gate 71, another input to which is applied from the five stage binary counter 64 when the binary counter reaches a count of 20. When the output of the activity checker circuit 68 initially goes high, this output transition is passed through an OR-gate 72 to reset the five stage binary counter 64 to its "0" or reset condition, thereby initiating synchronism of the bus receiver unit with the signals being supplied to the input of the decoder circuit 60.

The signal format of the location signals transmitted by the signpost transmitter 16 (FIG. 1) is a 10-bit binary code which is repeated twice in succession, with a space following the second transmission. After the space, this sequence is repeated again for the next cycle in the continuous transmission of the signpost location code. As a consequence, the output of the signpost decoder circuit 60, when the bus is within range of a signpost transmitter, is in the form of 20 successive binary data bits followed by a space or interval, which in turn is followed by another 20 successive data bits followed by a space, etc. The duration of the space interval in the signpost location code is sufficient for the output of the activity checker 68 to go low; so that upon resumption the reception of the location information, the low-to-high pulse transition is obtained at the output of the activity checker 68 to reset the binary counter 64.

In order to insure that the signpost location information is received error-free by the data-storage shift register 66, an extra stage, in addition to the 10 stages necessary to temporarily store the location information, is provided. The output of this extra eleventh stage then is continuously compared in an Exclusive OR-gate 74 with the information in the first stage of the register 66, with the output of the Exclusive OR-gate 74 being applied to the set input of an error indication flip-flop 75. There is no necessity for comparing any of the information in the shift register 66 until the eleventh bit of information has been received to indicate the beginning of a repetition of the location code. As a consequence, when the binary counter 64 reaches a count of eleven in accordance with the eleventh clock pulse obtained from the output of the signal processing circuit 61 after the last space in the receipt of the information from the signpost receiver, and also corresponding to the eleventh shift pulse applied to the shift register 66, a reset pulse is applied to the flip-flop 75 to place it in its reset condition.

So long as the flip-flop 75 remains in this reset condition, its output is indicative of error-free reception of a valid signpost location code. Thus, as the repetition or second successive transmission of the signpost location information is applied to the first stage of the shift register it is compared on a bit-by-bit basis in the Exclusive OR-gate 74 with the first reception of that information which is continuously being shifted into the last or eleventh stage of the shift register 66. So long as the compared bits agree, no output is obtained from the Exclusive OR-gate 74, and the flip-flop 75 remains in its reset condition. If, however, during the reception of this second sequence of the location code an error occurs, the flip-flop 75 is set by an output from the Exclusive OR-gate 74, changing its output condition.

When the space between successive double transmissions of the signpost information is reached, the output of the activity checker 68 goes low, causing the output of the inverter 69 to go high, thereby providing an input pulse to the AND-gate 71. The stepping of the binary counter 64 to a count of twenty provides an enabling pulse to the AND-gate 71; and if the flip-flop 75 is in its reset (error-free) state at this time, the AND-gate 71 produces an output pulse. This output pulse then is applied to a set of transfer coincidence gates 77, which also are supplied with the outputs of the first ten stages of the shift register 66. The outputs of the transfer gates 77 are applied to the first ten stages of a fifteen-stage location and time storage shift register 79 to transfer and store the location information into the shift register 79.

At the same time, the output of the AND-gate 71 is applied to another five stage binary counter 80 to reset the counter 80 to 0 and also operates to inhibit the output of a 12-second timer 81 which provides the input pulses to the five stage binary counter 80 at 12 second intervals. Following this transfer of information, the 12-second timer 81 resumes operation and provides an input pulse to the counter 80 each 12 seconds; so that the counter 80 stores the elapsed time interval following the last transfer of new location information into the shift register 79 which occurred before the bus left the range of the signpost transmitter. The outputs of the five stages of the binary counter 80 are connected to the inputs of the last five stages of the 15-stage shift register 79 to continually cause the output of the binary counter 80 to be stored in the shift register 79; so that at any given time after the bus is out of range of a signpost transmitter, the shift register 79 stores the address of the last signpost location passed by the bus and the length of time which has elapsed since the storage of this information.

Figure 4:
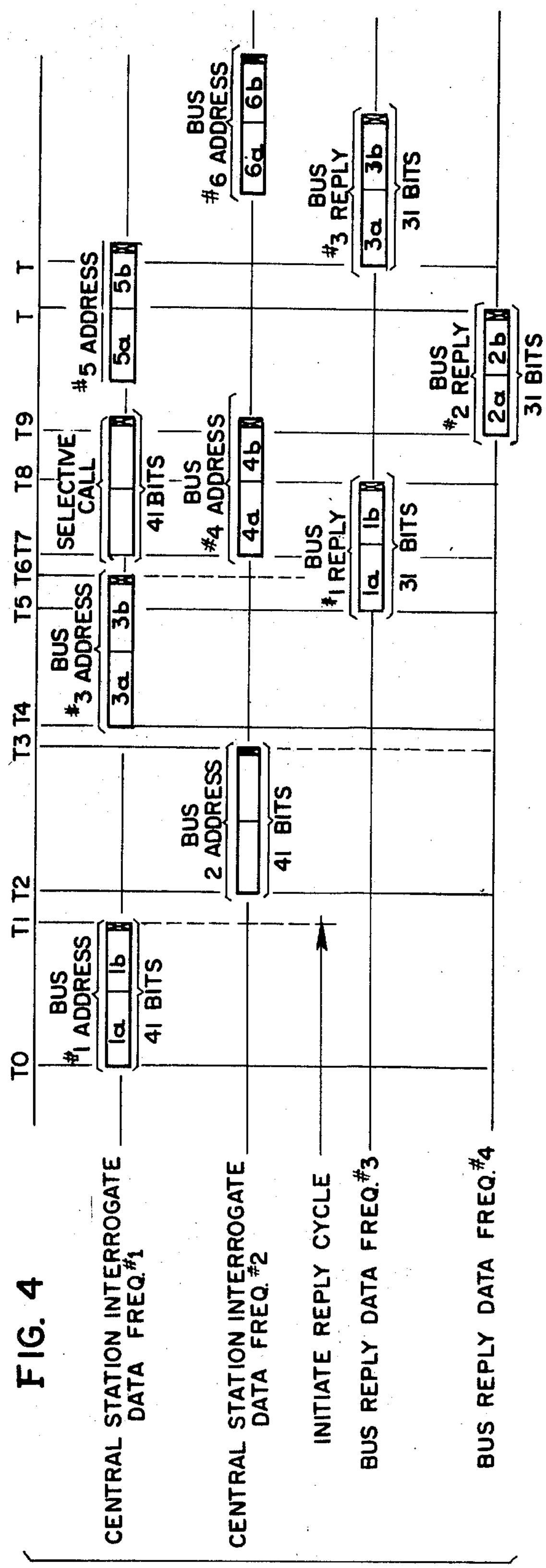
FIG. 4 illustrates the timing of the interrogation and reply signals used in the system shown in FIG. 1 and 2.

Referring now to FIG. 4, there is shown a sequence of automatic data interrogation and reply signal formats initiated under control of the computer 25 in the control station 10 (FIG. 1). As indicated in FIG. 4, the control station is shown as transmitting interrogation data on two frequencies, labeled Data Frequency No. 1 and Data Frequency No. 2, with transmissions to the buses taking place alternately on the two (data) frequencies. By utilizing two interrogation frequencies instead of a single frequency, it is possible to continuously send out data interrogation signals and still provide the desired gaps or intervals in the automatic data interrogation cycle to permit the insertion of selective call or other voice interrogation messages initiated by the dispatcher at the control station 10. More frequencies could be used or a single frequency having a provision for interruption of the data interrogation cycle for voice interrogation could be employed.

The data interrogation signal sequences consist of individual bus addresses which identify the bus and the mode of operation or type of reply which is desired. This information is transmitted twice in succession in order to enable an error checking or detection by the bus; and each complete address is 20 bits long, creating a total of 40 bits for the repeated address. This sequence is followed by a single marking bit at the end of the address to insure that the data is properly received by the bus data decoder. On a given interrogation frequency, a space interval of a duration sufficient to accommodate a similar 41 bit address from the selective calling unit is provided, but the computer controls interrogation on the other of the two data frequencies during this interval; so that interrogation is a continuous sequence, but alternating in transmission frequency.

The buses in the system being interrogated by the computer-operated control station are preset to operate on one or the other of the two data interrogation frequencies, and also are preset to reply on one or the other of two different data reply frequencies indicated as Bus Data Reply Frequency No. 3 and Bus Data Reply Frequency No. 4 in FIG. 4. The bus data reply signals are transmitted as a sequence of 31 bits, including a 15-bit message reply format repeated in order to enable an error check, followed by a single marking bit, for a total of a 31 bit reply. The interrogation of the buses on the data interrogation frequencies No. 1 and No. 2, and the replies of the buses for the data mode of operation on the reply frequencies No. 3 and No. 4 are automatic and under control of the operation of the computer 25 at the control station 10 (FIG. 1).

Referring, again, to FIG. 2 the receiver for a particular bus is normally set to receive signals on the data frequency No. 1 or No. 2 which has been preestablished for that bus. The signals obtained from the output of the bus receiver are applied to an interrogation data decoder circuit 83 which is similar to the signpost decoder circuit 60, and provides decoded binary data on two outputs, one of which corresponds to binary "1's" and the other of which corresponds to binary "0's" in the received interrogation address. The two outputs of the decoder circuit 83 are supplied to a signal processing circuit 85, which produces clock pulses in a manner similar to the manner of production of clock pulses by the processing circuit 61. Similarly, an activity checking circuit 86 is provided with the clock pulses and operates in a manner similar to the activity checking circuit 68.

The binary "1" output of the decoder circuit 83 is applied to the input stage of a five-stage mode-storage shift register 87, with shift pulses for the shift register 87 being obtained from the clock pulse output of the signal processing circuit 85. These clock pulses also are applied through an OR-gate 88 to a six-stage binary counter to drive the binary counter in synchronism with the application of the input signals to the shift register 87. As with the operation of the activity checker 68, when the activity checker 86 initially responds to input information, a low-to-high or positive-going pulse transition occurs at its output and is applied through an OR-gate 89 to reset the six-stage binary counter 90 to a 0 or initial count condition.

Figure 5:
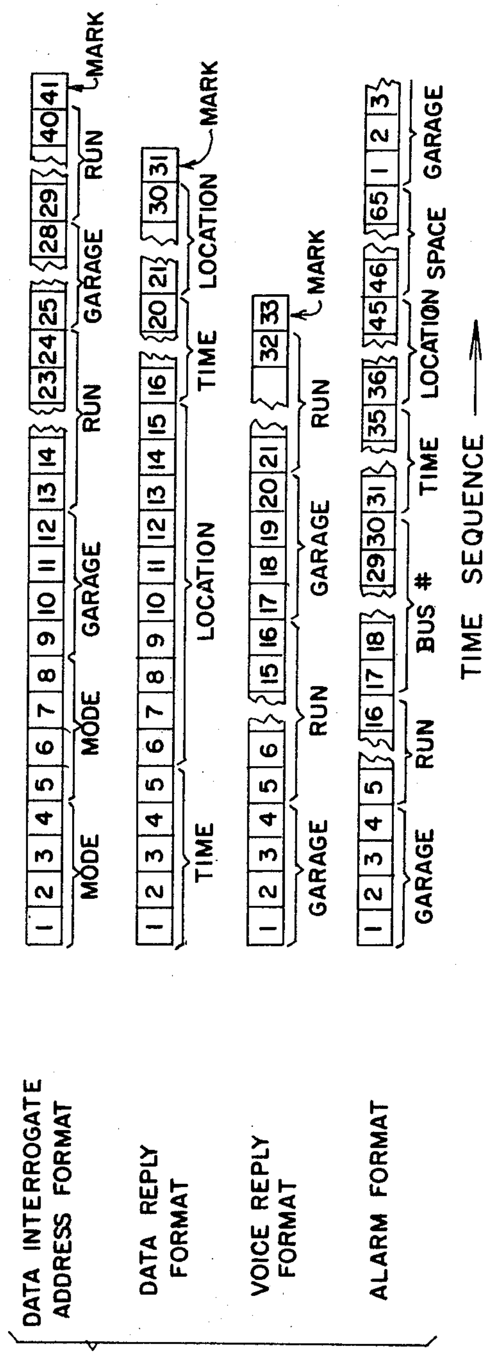
FIG. 5 illustrates message formats used in the system of a preferred embodiment of the invention.

In FIG. 5 the data interrogation address format is shown in detail, and consists first of four bits designating the mode of operation (data, voice, etc.) desired from the bus, with this sequence being repeated for the next four bits. The mode is followed by four bits identifying the garage number of the particular bus and 12 bits identifying the run of the particular bus. The garage and run sequence also is repeated, and the entire sequence is terminated by a marking bit for a total sequence of 41 bits. This information is supplied to the input of the shift register 87 in a manner similar to the manner of supply information to the input of the shift register 66.

In order to provide error checking of the mode of operation indicated by the interrogation address, a fifth stage is provided in the shift register 87, with the output of this fifth stage being compared with the output of the first stage in an Exclusive OR-gate 92 which operates as an error detection circuit in a manner similar to the operation of the Exclusive OR-gate 74. When the output of the activity checker circuit 86 initially goes high, a reset pulse is obtained and is applied to a mode evaluation control flip-flop 94, a mode evaluation storage circuit 96, and a bus error flip-flop 98 to place all of these circuits in a reset condition of operation.

When a count of five is attained by the binary counter 90, an output pulse is provided to one of the two inputs of an AND-gate 99 the other of which is enabled by the output of the activity checker 86. The output of the AND-gate 99 then is a reset pulse applied to a mode error flip-flop 100 to reset the flip-flop 100 to an "error free" indicating state. The set input of the flip-flop 100 is obtained from the output of the Exclusive OR-gate 92; and so long as the second set of four binary bits indicating the mode in the data interrogation address format correspond to the first four bits already received at this time, the mode flip-flop 100 is not placed in its set condition of operation and continuously enables an AND-gate 102 connected to the output thereof. In the event that there is a failure of correlation between a bit of the first set of four received mode interrogation bits and a bit of the fifth through eighth mode interrogation bits, the mode flip-flop 100 is placed in a set state of operation, disabling the AND-gate 102, and preventing any further operation of the bus reply system for the interrogation sequence in which the correlation failure is detected.

Assume, however, that the mode transmissions both agree, so that the received mode is indicated as error free. The AND-gate 102 is then enabled. When a count of eight is reached by the binary counter 90, indicating that the mode information has been received twice, the counter provides an output of the flip-flop 94 to place the flip-flop in its set condition of operation, causing an output pulse to be supplied to the AND-gate 102 which passes the pulse to set the mode evaluation circuit 96 in accordance with the information stored in the first four stages of the mode storage shift register 87. This output pulse from the flip-flop 94 also is applied through the OR-gate 89 to reset the six-stage binary counter 90 to its initial or 0 count. Since the reset input to the flip-flop 94 is responsive only to positive going transitions and since activity continues to be detected by the activity checker 86, no further reset pulse is applied to the flip-flop 94 until termination of reception of the interrogation code; so that the flip-flop 94 cannot operate to produce an output pulse the next time that the binary counter reaches a count of eight. Resetting of the flip-flop 94 only occurs after activity ceases to be detected by the activity checker 86 and then once again is detected to produce the reset pulse. Once the mode has been selected, an indication that this has occurred is applied in the form of an enabling signal from the mode evaluation circuit 96 connected as one input to an AND-gate 104 the output of which is connected to the set input of the bus error flip-flop 98.

Up to this point in the receipt of the data interrogation address there is nothing unique in the address for any particular bus since all of the buses respond to the mode portion of the address format in the same manner. Thus, it is necessary to provide some means of establishing an identification of the particular bus from which a response is desired. This is accomplished by the next portion of the data interrogation address format shown in FIG. 4 by the garage number and run number portions of the address sequence. The combination of the garage number and the run number uniquely identifies a particular bus out of all of the buses in the system.

This garage number and run number is set in the bus on thumbwheel switches indicated in a thumbwheel switch unit 106. The portion of this address pertaining to the garage number may also be prewired into the bus, since the bus normally would be assigned to only a single garage and would not move from garage to garage. Whether the address is entirely established by the settings of the thumbwheel switches in the unit 106 or is established in part by thumbwheel switches and prewired addresses is unimportant to the operation of the system.

The switches in the unit 106 are sequentially gated by the stepping of the binary counter 90 through the first 16 counts and again through the next 16 counts to produce a repeated sequence of binary output pulses encoded in accordance with the switch settings. This repeated sequence of output pulses, corresponding to the settings of the thumbwheel switches 106, is compared with the incoming binary information in an Exclusive OR-gate 108, the incoming binary information being obtained from a single-stage bit storage register 109 which is provided with the "1" output of the decoder circuit 83 and which is triggered to store each bit by the clock pulses obtained from the output of the signal processing circuit 85.

So long as there is agreement between the incoming bits at the output of the bit storage register 109, and the sequence from the thumbwheel switches 106, no output pulse is produced by the Exclusive OR-gate 108; so that the output of the gate 108 after being inverted by an inverter 110 remains high and is applied to one of the inputs of the AND-gate 104. Whenever disagreement between the setting of the thumbwheel switches 106 and the received data occurs, the output of the Exclusive OR-gate 108 goes high or positive, causing the inverted output thereof to go low, disabling the AND-gate 104. Thus, when disagreement of the received and locally generated addresses occurs, no output may be obtained from the AND-gate 104.

At the present time, however, assume that the setting of the thumbwheel switch addresses corresponds to the received address in the data interrogation address format for the bus illustrated in FIG. 5. When this occurs, the output of the inverter 110 remains high; and when the counter 90 reaches a count of 32 an output is obtained and applied to the third input of the AND-gate 104, causing it to produce an output pulse to set the bus error flip-flop 98 to its set state of operation. The flip-flop 98 then produces an output pulse which is passed by one or the other of a pair of AND-gates 111 and 112 corresponding to the data and voice modes of operation, respectively, as determined by the mode evaluation circuit 96.

If the mode evaluation circuit 96 has decoded the mode as a data mode, an output signal is obtained from the AND-gate 111, and if the mode is a voice mode, an output signal is obtained from the AND-gate 112. It should be noted that the bus error flip-flop 98 is not placed in its set condition at the count of 32 unless there is correspondence between the address on the thumbwheel switches 106 and the received address in the data interrogation format. As a consequence, in those buses not being addressed by the particular interrogation address format, no output is obtained from either one of the AND-gates 111 and 112.

Assume that the mode evaluation circuit has decoded a data mode of operation for the bus, which indicates an automatic data reply from the bus, and that the bus error flip-flop 98 is set to produce an output from the AND-gate 111. This output is applied to a transmitter frequency selecting circuit 113 which provides an output frequency to the transmitter corresponding to the data frequency of reply from the bus. At the same time, a signal is applied to the transmitter to turn on the transmitter and through a transmitter turn-on delay circuit 115 to the automatic reply logic for the bus. The delay circuit 115 provides sufficient time for the transmitter 114 to build up full power prior to the application of the reply data to it.

The output of the transmitter turn-on delay circuit 115 is applied through the OR-gate 72 to reset the five-stage binary counter 64 in the event that the counter is already not in the reset state of operation. In addition, this output is provided through an OR-gate 151 to inhibit the output of the decoder 60 and through an OR-gate 117 to enable a data output AND-gate 118 and is applied to an AND-gate 121 to enable the gate 121.

In a data encoder 120 carried by the bus there is a continuously operating 100 kHz. clock, which produces output pulses on a clock line 122 applied as the other input to the AND-gate 121. Thus, the clock pulses are passed by the AND-gate 121 to the binary counter 64 through the OR-gate 63 to commence stepping of the binary counter 64. In addition, these clock pulses are applied through an OR-gate 124 and an enabled inhibit gate 125 to operate as shift pulses for the shift register 79, causing the output of the shift register 79 to be applied over a lead 127 through a data OR-gate 128 and the enabled AND-gate 118 to the data encoder 120. The data encoder then translates the digital data into a form suitable for modulating the carrier of the transmitter 114, which transmits the information to the control station 10. The information stored in the shift register 79 is sequentially stepped out of the shift register and forms the data reply format shown in FIG. 5, the first five bits of which are the time bits which were stored in the last five stages of the shift register. The next 10 bits are the location information which was stored in the shift register 79 upon operation of the transfer gates 77, as previously described.

In order that an error check of the information transmitted by the bus may be made at the control station, it is desirable to transmit the information stored in the shift register 79 twice in succession. Since the shift register normally would be emptied of information upon the application of fifteen shift pulses thereto, the output of the last stage of the shift register is connected back to the input of the first stage to operate the register in the manner of a ring counter. Thus, as shift pulses continue to be applied to the register 79 the information shifted out on the sixteenth shift pulse is the same as the information shifted out on the first shift pulse.

It is apparent that this operation would continue indefinitely; so that when the five stage binary counter 64 reaches a count of thirty (corresponding to the application of thirty shift pulses from the clock line 122), an inhibit pulse is applied to the inhibit gate 125 to terminate the shifting of information from the shift register 79. This output pulse at the count of thirty also may be used to turn off the transmitter 114 and to reset the mode evaluation circuit 96, but such connections have not been shown in order to avoid unnecessary cluttering of the drawing. In a system which has been built and operated, the time between the start of the bus address interrogation and the completion of the reply is under one-eighth of a second; so that 3,300 buses may be interrogated and reply in approximately 2½ minutes.

As stated previously, it is possible for the dispatcher at the control station 10 to interrogate a bus for reply on a voice frequency by use of a selective call address for the bus. The selective call address format is the same as the data interrogation address format, but the address mode is encoded for a voice reply. In the bus, reception and processing of a selective call address is the same as reception and processing of a data address, but the output of the mode evaluation circuit 96 enables the AND-gate 112 instead of the AND-gate 111. If the bus error flip-flop 98 provides an output upon termination of comparison of the received bus garage number and run number with the thumbwheel switch settings in the bus, an output is obtained from the AND-gate 112 indicative of the voice mode of operation. For an "all call" (all buses) an output is provided directly from the mode evaluation circuit 96 when the "all call" mode is determined. The "all call" output and the output of the AND-gate 112 are utilized in the bus to energize an indicating lamp and/or to activate a buzzer to call the driver's attention to the fact that his bus has been called by the dispatcher in the control station. Until the driver takes further action, nothing more happens in the bus.

When the driver desires to respond to the voice interrogation, he takes his handset off-hook, which provides an output from a hang-up switch 130 associated with his radio. The output of the switch 130 is applied through an OR-gate 131 to the transmitter frequency selection circuit 113, which then causes the transmitter 114 to operate on a voice mode return frequency.

In the type of radio used in the buses 11 the operator, in order to transmit, must depress a push-to-talk switch 134 which, when it is initially depressed causes a low-to-high or negative-to-positive transition to occur, with the output remaining positive for the duration of time that the switch 134 is depressed. This transition sets a voice control flip-flop 136 to its set state of operation, with the flip-flop then providing an enabling signal to a pair of AND-gates 137 and 138. A the same time, the output pulse from the push-to-talk switch output is passed through an OR-gate 140 and the OR-gate 89 to reset the six stage binary counter 90.

The clock pulses from the data encoder 120 appearing on the clock line 122 then are passed by the AND-gate 138 through the OR-gate 88 to drive the six-stage binary counter 90. This permits the output of the binary counter 90 to sequentially sample the settings of the thumbwheel switches corresponding to the garage and run sequences, and this sequence of data bits is passed through a normally enabled inhibit gate **140*b* and the now enabled AND-gate 137, the OR-gate 128, and AND-gate 118 (which also is enabled by the output of the push-to-talk switch 134) to the data encoder 120, which then supplies the modulation signals corresponding to the thumbwheel switch setting to the transmitter 114. This information is supplied twice during the counts one to 16 and 17 to 32 in a manner similar to the manner in which the information was supplied to the input of the Exclusive OR-gate 108** during the address comparison operation of the circuit.

When the counter 90 reaches a count of 32 upon the completion of the repeated sequential sampling of the thumbwheel switches 106, a reset pulse is applied from the counter 90 to the voice control flip-flop 136 causing it to be reset, thereby disabling the AND-gates 137 and 138. This then terminates operation of the binary counter 90 and the transmitter 114 may be operated in a normal voice transmission mode.

Upon termination of the reply in the voice mode of operation, the hang-up switch is again placed on an on-hook condition, rendering the transmitter frequency select circuit 113 once again responsive to output signals from the AND-gate 111 in the event that the bus is interrogated in the data mode. It should be noted that while the transmitter frequency selector is provided with an output from the OR-gate 131 causing it to select a voice frequency for transmission by the transmitter 114, the frequency selector 113 is disabled from operating in the data mode of operation. To prevent operation of the logic circuitry involving the binary counter 90 during voice transmission, a voice inhibit signal is applied through an OR-gate 150 to the decoder circuit 83, preventing the application of output signals from the decoder 83 so long as the hang-up switch 130 is in an "off-hook" condition.

As stated in conjunction with the general description of operation of the system shown in FIG. 1, an additional mode of operation in the bus is provided, this being the "alarm" mode of operation. In the event that the bus driver desires to alert the dispatcher at the control station 10 to an alarm condition on the bus, such as would be occassioned by an attempted robbery or other emergency condition, the driver may depress the alarm foot switch 55 (FIG. 1) which in turn activates an alarm timer 155 (FIG. 2) associated with the bus reply control logic. The time interval of the signal provided by the timer 155 is chosen to be 2 minutes, which allows for repeated operation of the alarm reply data format in order to insure that it is properly received at the control station 10.

The output of the timer 155 disables the data decoder 83 and the signpost decoder 60 by the application of disabling signals through the OR-gates 150 and 151. This output also is an alarm enable signal which is applied to one of the three inputs of an alarm AND-gate 157 to enable and AND-gate 157 and is applied through the OR-gate 131 to cause the transmitter frequency selector circuit 113 to switch the operation of the transmitter 114 to the voice transmission frequency. This signal also is passed through the OR-gate 117 to enable the AND-gate 118 and is passed through the OR-gate 140 to reset the six-stage binary counter 90 through the OR-gate 89. In addition, this signal is used to enable an alarm control AND-gate 159 and to set an alarm control flip-flop 160 to its set state of operation through an OR-gate 141.

The initial portion of the alarm data reply format is the same as the voice reply format and is under control of the stepping of the six-stage binary counter which obtains stepping pulses through the OR-gate 88 from the output of the AND-gate 159. These stepping pulses are the clock pulses appearing on the lead 122. During the first 16 counts, an output is obtained from the binary counter 90 to enable an inhibit gate 162 which then passes the scanned output of the thumbwheel switches 106 through an OR-gate 164 to the AND-gate 157, which is enabled from the set output of the alarm control flip-flop 160 to provide output data pulses through the OR-gate 128 and the now enabled AND-gate 118 to the data encoder 120.

The binary counter 90 continues to be stepped by the clock pulses from the data encoder appearing on the lead 122; and at the count of seventeen, the inhibit gate 162 is blocked and an inhibit gate 166 is enabled, with the binary counter 90 sequentially sampling the bus number which is prewired into a bus number identification unit 165 to cause a sequence of data bits corresponding to the bus number to be passed by the inhibit gate 166 through the gates 164, 157, 128 and 118 to the data encoder 120. When the count of 30 is reached by the binary counter 90 the bus number has been transmitted as indicated in the alarm format sequence shown in FIG. 5. At this time the inhibit gate 166 is blocked; so that no further pulses are passed from the output of the bus number unit 165.

At the count of 30 an output is obtained from the binary counter 90 and is applied to the reset input of the alarm control flip-flop 160 to change its state to the reset condition. This causes the set output to drop or become more negative, so that the AND-gate 157 is disabled and no further outputs are applied to the OR-gate 128 from the thumbwheel switch unit 106 and the bus number unit 165. In the reset condition, however, the output of the alarm control flip-flop 160 enables an AND-gate 168 to pass the clock pulses appearing at the output of the AND-gate 159 through an OR-gate 124 and the now enabled inhibit gate 125 to the shift register 79. These clock pulses then cause the information stored in the shift register 79 to be shifted out over the lead 127 and through the OR-gate 128 and AND-gate 118 to the data encoder 120. Thus the time and location stored in the shift register 79 is provided to the data encoder 120.

The six-stage binary counter 90 continues to be stepped in the manner described previously, and when the count of 45 is reached, signifying that the 15 bits stored in the shift register 79 have been transferred to the data encoder 120, an output pulse is applied from the six-stage binary counter 90 through the OR-gate 141 to the set input of the alarm control flip-flop 160 to return it to its set condition. This prevents the application of further shift pulses to the shift register 79, and the AND-gate 157 once again is enabled. The binary counter 90 continues to count the clock pulses from a count of 46 to a count of 65 which resets the counter since the maximum count that can be attained by the counter 90 is a count of 64.

During this period of time, both of the inhibit gates 162 and 166 are blocked; so that no data signals are applied to the input of the data encoder 120. As a consequence, the time interval for the clock pulses producing the count of 46 through 65 is transmitted as a long space by the transmitter 114. When the binary counter 90 resets to 0, the foregoing sequence of operation is repeated. This repetition occurs so long as the 2 minute timer 155 produces an output. Since a complete double-frame alarm message, which is necessary for error checking, is transmitted every 100 milliseconds there are approximately 1,200 repetitions of the alarm message in the 2-minute period, which assures that the alarm message will reach and be properly decoded by the control station. At the end of the 2 minute interval established by the timer 155, the system reverts back to its original mode of operation, ready for reception and processing of signals obtained by the bus receiver and decoded in the decoder unit 83.

Figure 6:
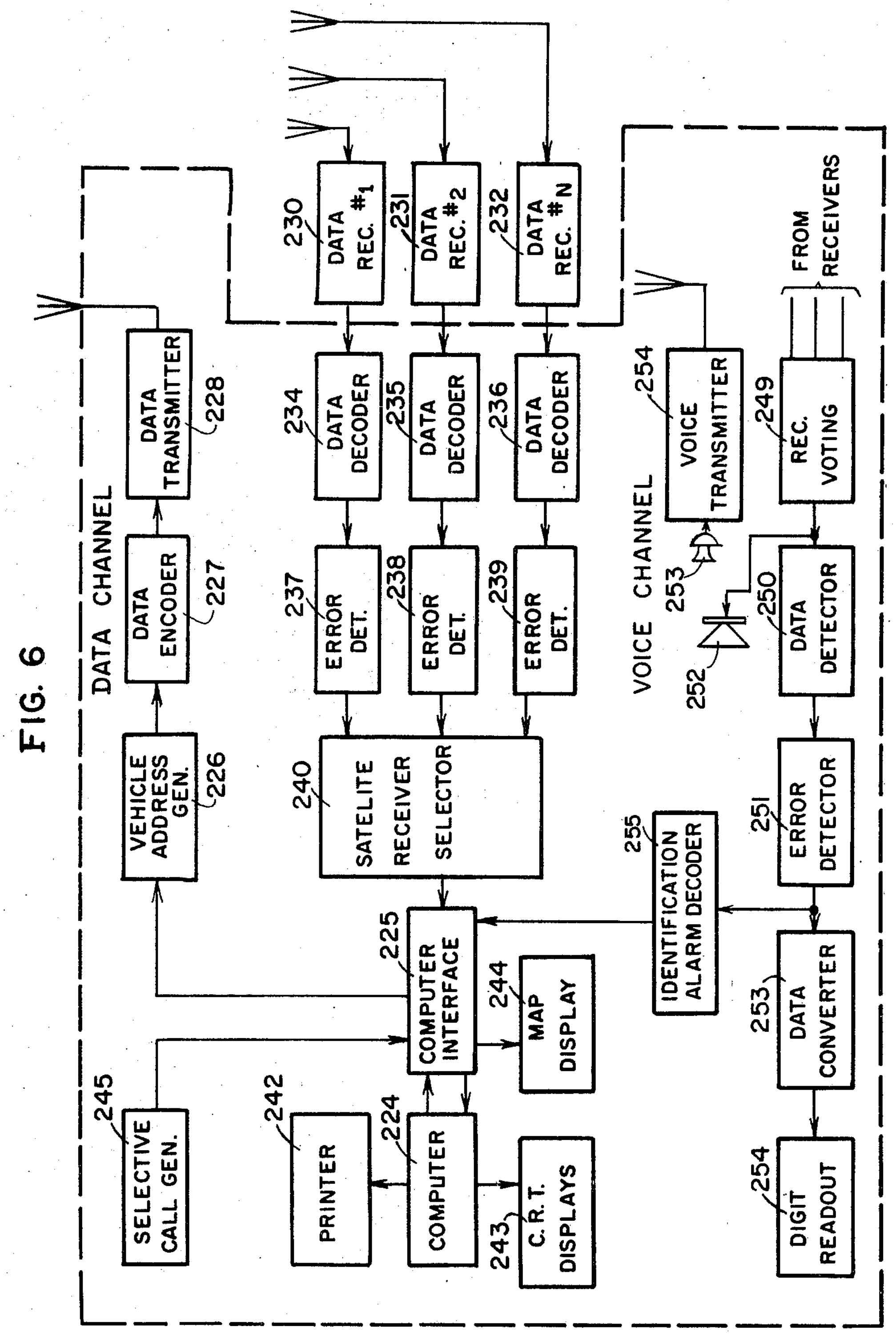
FIG. 6 is a more detailed block diagram of the control center of the preferred embodiment of the invention illustrated in FIG. 1.

Referring now to FIG. 6, there is shown a more detailed block diagram of control station system for sending the data interrogation signals to the buses and for processing the reply signals received from the buses. The circuit shown in FIG. 6 is substantially the same as the circuit shown in the control station 10 of FIG. 1 but includes additional details. In FIG. 6 the computer 224, which controls the transmission of the data interrogation address format in accordance with the route and scheduling information, supplies the interrogation format through the computer interface unit 225 to the vehicle address generator 226 which responds to the interrogation sequence to generate the vehicle garage and run numbers necessary for the address format. The output of the vehicle address generator then is supplied through a data encoder 227 which converts the binary digital data to tones for modulating the output of a data transmitter 228, operating on the data interrogation frequency to continually and sequentially interrogate the buses in the system in accordance with the interrogation program in the computer 224 and in accordance with the format shown in FIG. 4.

As stated in conjunction with FIG. 4, it is desirable to provide at least two data transmission frequencies to provide openings or spaces in each of the interrogation sequences for the insertion of the selective call addresses when a dispatcher desires to initiate a call to a given bus or group of buses on the voice frequency. Only a single data transmitter 228 has been shown in FIG. 6 but it is apparent that switching between two data transmitters operating at the two data interrogation frequencies also could be accomplished automatically by an output from the computer 224 and through the computer interface unit 225.

For each of the data reply frequencies over which the buses automatically respond to the data interrogation from the control station there are a number of data receivers tuned to receive the data reply, and three such receivers 230, 231 and 232 are shown in FIG. 6. Each of the receivers 230, 231 and 232 supplies input signals to a corresponding data decoder 234, 235 and 236, respectively, which converts the tone signals from the corresponding data receiver into the binary digital signals for processing by the remainder of the control station circuitry. The outputs of the data decoders are supplied to corresponding error detector circuits 237, 238 and 239. These error detector circuits check the two frames of information bit by bit in a manner similar to the error checking provided by the Exclusive OR-gates 74 and 92 in the bus to ascertain identity of the double-frame transmission. If an error is detected by an error detector circuit, no output is provided from that error detector circuit.

Since the same information may be received on more than one of the data receivers 230, 231, 232, it is necessary to select one only of the receivers for each of the bus replies. This is effected by a satellite receiver selector unit 240 which scans the outputs of the error detector circuits 237–239 until an error-free output is found. This output then is used and is provided by the receiver selector 240 to the computer interface unit 225, which supplies the received reply to the computer 224 for comparison with the preestablished schedule for the bus making the reply. If the bus is on schedule or within the preestablished limits of the schedule no output is provided by the computer 224.

If the replying bus, however, is not on schedule or within the predetermined limits of the schedule, the computer 224 provides an output to a printer 242 which maintains a record of all of the off-schedule operations. In addition, the off-schedule bus is identified on a cathode ray tube display 243 and on a map display 244; so that the dispatcher has an instantaneous appraisal of the status of off-schedule buses interrogated by the computer 224.

A selective call generator 245, which is similar to the selective call generator 44 shown in FIG. 1 is provided to permit selective calling by the dispatcher of buses such as off-schedule buses in the manner indicated in the format on the central station interrogation frequency No. 1 shown in FIG. 4. The selective call address may be directed to a particular individual bus or to a group of buses, which then respond in the manner indicated previously in the description of FIG. 2.

When the buses reply on the voice frequencies, the voice frequency receivers supply inputs to a receiver voting circuit 249, which selects the strongest signal in accordance with known techniques and provides an output to a loudspeaker 252. The dispatcher communicates with the bus by way of a microphone 253 providing an input to a voice transmitter 254.

As discussed in conjunction with the description of operation of the circuit shown in FIG. 2, whenever a bus replies on the voice frequency, the bus is identified by garage and run data information in the case of a voice reply and by garage, run, bus number, time and location in the case of an alarm signal on the voice frequency. This information is decoded in a data decoder 250 which supplies an input to an error detector 251, which is similar to the error detectors 237 through 239. If the data is error-free, it is supplied to a data converter 253, which converts the binary data into digital data supplied to a digital readout device 254. This information also is supplied to an identification and alarm decoder 255.

If a voice reply is received, only the digital readout unit 254 provides an output indication of the identification of the bus making the reply since the data information in the voice mode of operation is only a 33 bit sequence, whereas in the alarm sequence it is a 45 bit sequence separated by a 20 bit space and then repeated. If an alarm format is being received, the identification and alarm decoder circuit 255 recognizes the alarm format because of its length; and an alarm signal of either a visual or audio type or both may be energized by the output of the identification and alarm decoder 255. This information also is supplied to the computer interface unit 225 and to the map display unit 244, which, in conjunction with the information stored in the computer 224, may be utilized to indicate the location of the alarmed bus on the map display 244 for instantaneous identification by the dispatcher. This latter feature is not necessary although it tends to facilitate the action to be taken by the dispatcher upon the receipt of an alarm from a bus.

As discussed in conjunction with the description of the operation of the bus circuit shown in FIG. 2, the timer 81 is indicated as a 12 second interval timer producing an output pulse every 12 seconds. This timer may be a free running timer, with the inhibit signals obtained from the output of the AND-gate 71 during the transfer of information into the shift register merely blocking the output of the timer 81 to the input of the binary counter storage unit 80 when the counter 80 is being reset. Thus, it is possible for an output pulse to be obtained from the timer after the reset at any time from immediately after the reset up to the full 12 second interval. In order to minimize the inaccuracy presented by this possibility, a 6 second bias is inserted into the computer program which then provides a mean from which the time deviation to within one-tenth of 1 minute accuracy may be reported or established by the bus. At the nominal bus speeds used in most cities, this represents a distance of less than 135 feet.

It should be also noted that the use of a timer operating with a 12 second interval in conjunction with the five bit binary storage counter 80 permits for over 6 minutes of elapsed time storage before the capacity of the counter 80 is reached and it is reset by the next time pulse from the timer 81. Since all of the buses are interrogated every 2 and ½ minutes, this capability of storage in the binary counter 80 far exceeds the cycle time necessary to interrogate the buses.

A provision can be made in the buses for selecting the particular set of frequencies on which the bus is to operate with this being established in advance in accordance with the manner in which the computer is programmed to operate the data transmitters and receivers at the control station.

It should be apparent that the bus control station electronics may be easily expanded to incorporate any necessary additional monitor functions. Since the basic address format permits for up to 12 additional forms of data retrieval besides the simple data and three voice modes discussed in conjunction with the operation of the circuit shown in FIG. 2, it merely is necessary to expand the capacity of the mode evaluation circuit 96 and to supply additional storage units and operating electronics to respond to such additional modes if they are desired. In addition a software change in the computer would be necessary to interpret the results received back from the buses. Additional modes which could be utilized would be to use the bus to report conditions of the traffic light synchronizing equipment located at or near signpost locations, or the bus could automatically record, store and transmit upon command information relating to the passenger count, the fares, engine conditions, etc. The basic system operation, however, would be the same for these additional modes of operation and could be provided on an automatic basis upon command from a data interrogation from the control station. It is relatively simple to change the tolerances of the system at the control station computer to adjust the display of off-schedule buses in the event that a snowstorm or the like causes a major disruption of normal schedules. Without an ability to provide such a tolerance adjustment, major disruptions would result in a display of such a large number of off-schedule buses, that the display would be almost meaningless.

It also should be noted that the system could be employed to monitor truck routes, railroad transportation, police vehicles or the like and is not limited to a bus monitoring system.

We claim:

1. In a vehicle-monitoring system having a central control station with transmitter means for transmitting interrogation signals on a first frequency corresponding to desired replies in either a first or a second mode, the control station also including transmitter means for transmitting signals on a second frequency, and receiver means for receiving signals on at least one receiver frequency, at least one vehicle to be monitored, with position indicating transmitting means located at predetermined positions along a route travelled by the vehicle and having a transmission range which is substantially less than the transmission range of the control station transmitter means, each position indicating transmitting means transmitting unique position information, a vehicle reporting system in said vehicle including in combination:

first storage means for storing said position information;

first receiver means responsive to the position information transmitted by said position indicating transmitting means for supplying said position information to the storage means;

elapsed time indicating means reset to an initial time indication in response to the supplying of said position information to the storage means;

clock means for driving the elapsed time indicating means for indicating the time interval subsequent to the time of the last resetting of the elapsed time indicating means;

second receiver means normally operated to be responsive to input signals from the control station on said first frequency;

means coupled with the second receiver means for determining the mode of replies desired from said vehicle;

second storage means for storing a unique vehicle identification code;

means for comparing said interrogation signals with the code stored in the second storage means;

vehicle transmitter means for operation on said control station receiver means frequency;

means responsive to an output of the comparing means signifying the reception of interrogation signals corresponding to the stored vehicle identification code and responsive to an output to the mode determining means indicative of a desired reply in said first mode for causing the vehicle transmitter means automatically to transmit the information stored in the elapsed time indicating means and the first storage means.

2. The combination according to claim 1 further including alarm means in said vehicle for causing transmission of the information stored in the elapsed time-indicating means and the first and second storage means by the vehicle transmitter in response to the operation of the alarm means.

3. The combination according to claim 1 wherein said vehicle is one of a plurality of vehicles each having a different unique vehicle identification code stored in the second storage means thereof, said central control station sequentially transmits interrogation signals on said first frequency along with said vehicle identification codes corresponding to desired replies in said first mode, and wherein each vehicle further includes comparing means for comparing the received vehicle identification code with the code stored in the second storage means, the output of the comparing means controlling the operation of the vehicle transmitting means enabling automatic operation thereof in said first mode when the stored identification code and received vehicle identification code correspond.

4. The combination according to claim 3 wherein said control station receiver means receives signals on two frequencies and further including means at the central control station for inserting into the sequence of interrogation signals corresponding to desired replies in the first mode, a selected interrogation signal addressed to a selected vehicle corresponding to desired replies in a second mode from said vehicle, and means in each of said vehicles responsive to received interrogation signals corresponding to a desired reply in said second mode for indicating said second mode, wherein the vehicle transmitter means may be operated at said two control station receiver means frequencies, with means responsive to initiation of operation of the vehicle transmitter means at one of said frequencies for coupling and initiating transmission of the output of the second storage means to the control station at said one frequency; and wherein the initiation of operation of the vehicle transmitter means at said one control station receiver means frequency also causes the vehicle receiver means to be operated at said one frequency.

5. The combination according to claim 4 wherein the sequential transmission of interrogation signals by the central control station for desired replies in said first mode includes predetermined time intervals for permitting the transmission of interrogation signals corresponding to desired replies in said second mode.

6. In a vehicle monitoring system having a central control station with a transmitter and a receiver and at least one vehicle to be monitored, with position indicating transmitting means located at predetermined positions along a route travelled by the vehicle and having a limited transmission range with respect to the route length, each position indicating transmitting means transmitting unique position information, a vehicle reporting system in said vehicle including in combination:

storage means for storing said position information;

first receiver means responsive to the position information transmitted by said position indicating transmitting means for supplying said position information to the storage means;

elapsed time indicating means reset to an initial time indication in response to the supplying of said position information to the storage means;

clock means for driving the elapsed time indicating means for indicating the time interval subsequent to the time of the last resetting of the elapsed time indicating means; and transmitter means connected for receiving and transmitting the position information from the storage means and the elapsed time indication from the elapsed time indicating means.

7. The combination according to claim 6 further including a second receiver means in said vehicle and wherein the control station transmitter transmits interrogation signals and the vehicle transmitter means includes transfer means coupled with the storage means and the elapsed time indicating means, and a signal transmitter coupled with the transfer means, with the transfer means operating in response to an interrogation signal received by the second receiver means from the control station for causing the information stored in the storage means and in the elapsed time indicating means to be supplied to and transmitted by the signal transmitter.

8. The combination according to claim 7 further including comparing means in said vehicle, wherein the storage means is a first storage means and wherein the vehicle reporting system includes a second storage means in said vehicle, the second storage means storing an identification code unique to said vehicle, the interrogation signal from the central control station including a vehicle identification code portion, the received interrogation signal and the output of the second storage means being supplied to the comparing means, the output of the comparing means controlling the operation of the transfer means and the signal transmitter, causing the transfer of the position information and the elapsed time indication to the vehicle transmitter means only when the received vehicle identification code portion of the interrogation signal corresponds to the identification code stored in the second storage means.

9. The combination according to claim 8 wherein said vehicle is one of a plurality of vehicles, each having a different unique vehicle identification code stored in the second storage means thereof.

10. In a vehicle monitoring system having a central control station with transmitter means for transmitting interrogation signals on a first frequency corresponding to desired replies in either a first or a second mode, the control station also including transmitter means for transmitting signals on a second frequency, and receiver means at the central control station for receiving signals on at least two receiver frequencies the control station transmitter means and receiver means being adapted for communication with at least one mobile communications station, the mobile communications station including in combination:

first storage means for storing data corresponding to a condition to be reported;

second storage means for storing a unique mobile communications station identification code;

mobile receiver means normally operated to be responsive to input signals from said control station on said first frequency;

mode determining means coupled with the mobile receiver means and responsive to the received interrogation signals for providing an output indicative of the mode of the replies desired from said mobile communications station;

means for comparing said interrogation signals with the code stored in the second storage means;

mobile communications station transmitter means connected to receive and transmit the data stored in the first storage means and the identification code stored in the second storage means; and means responsive to an output of the comparing means signifying the reception of interrogation signals corresponding to the stored vehicle identification code and responsive to an output of the mode determining means indicative of a desired reply in said first mode by said mobile receiver means for causing the mobile communications station transmitter means automatically to transmit said stored data on one of said two control station receiver means frequencies.

11. The combination according to claim 10 wherein the mobile communications station transmitter means may be operated at the other of said two control station receiver means frequencies, with means responsive to initiation of operation of the mobile transmitter means at said other frequency for initiating transmission of the identification code stored in the second storage means to the control station.

12. The combination according to claim 11 further including indicating means in said mobile station coupled with the mode determining means and energized in response to an output of the mode determining means indicative of a reply desired in said second mode.

13. The combination according to claim 11 further including alarm means in the mobile communication station, with operation of the alarm means causing transmission of the data stored in the first storage means and the identification code stored in the second storage means by the mobile transmitter means at said other control station receiver frequency.

14. The combination according to claim 13 wherein the alarm means further includes timing means for causing repeated transmission of said data and said identification code for a predetermined length of time.

15. The combination according to claim 11 wherein the initiation of operation of the mobile transmitter means at said other control station receiver frequency also causes the mobile receiver means to be operated at said second frequency.

16. The combination according to claim 15 wherein the first frequency from the control station is used for data transmission and the second frequency from the control station corresponds to a voice channel, with the one transmitting frequency of the mobile transmitter means corresponding to a data channel and with the other transmitting frequency from the mobile transmitter means corresponding to a voice channel, wherein receipt of interrogation signals on the first frequency from the control station corresponding to the second mode of operation causes an alerting means to be energized at the mobile communications station.

17. A vehicle-monitoring system having at least one vehicle to be monitored, with the vehicle having means for determining its position as it moves along a route, the system including in combination, a central control station-having receiver means for receiving information from a vehicle, memory means for storing information as to the schedule for the vehicle, and means for comparing the stored information with the received information; and apparatus on the vehicle including storage means for storing the vehicle position information, elapsed time measuring means for measuring the time elapsed subsequent to the storage of position information, and transmitter means connected to said storage means and to said time measuring means for transmitting to the central station the position information and the elapsed time information.

18. The system of claim 17 further including transmitter means at the central station for sending interrogation signals to the vehicle, receiver means at the vehicle for receiving said interrogation signals, and means at the vehicle responsive to the received interrogation signals for causing said transmitter means at the vehicle to transmit position information and elapsed time information.

19. The system of claim 17 including display means at the central station for indicating deviations of the received information from the stored schedule information.

* * * * *